March 13, 1934.   T. C. VAN DEGRIFT   1,950,887
INTERNAL COMBUSTION ENGINE
Filed July 16, 1930
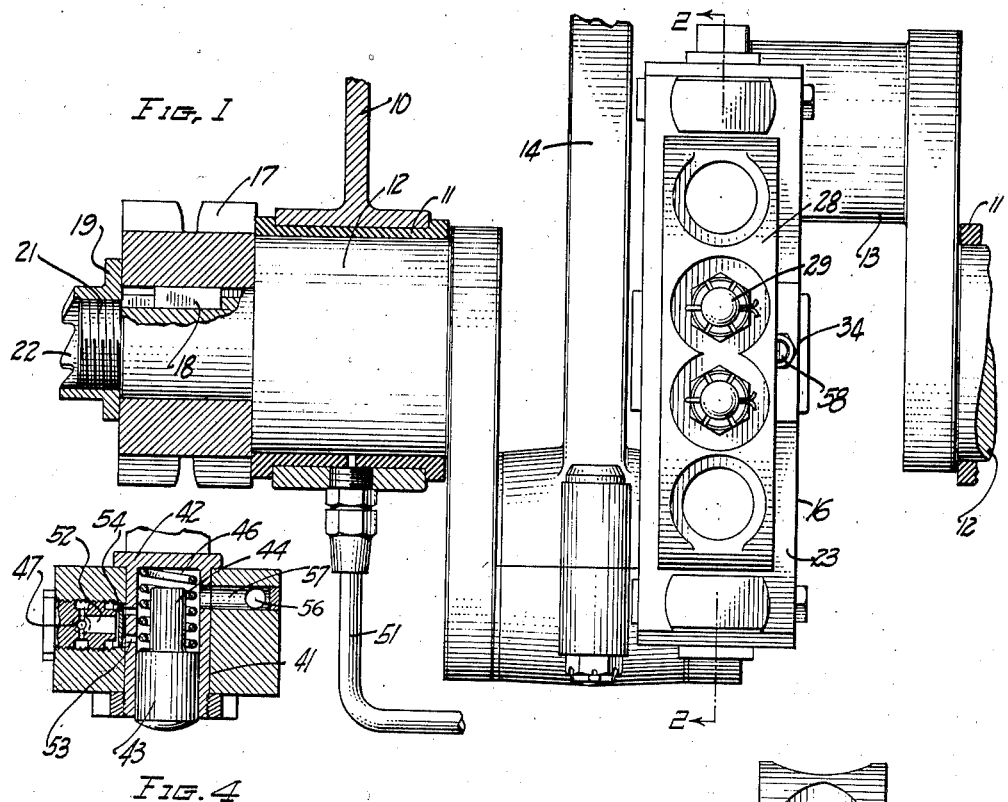
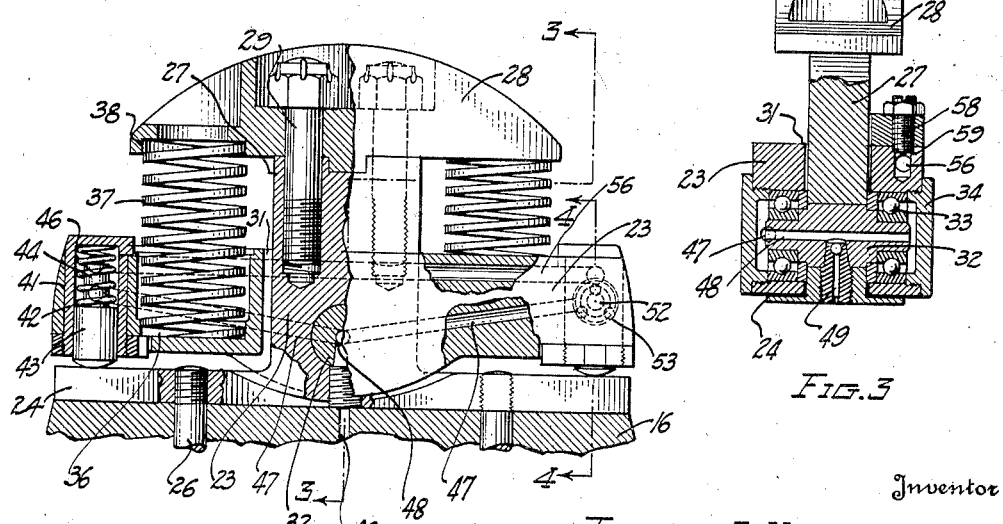
Inventor
THOMAS C. VAN DE GRIFT
Attorney Patented Mar. 13, 1934

1,950,887

UNITED STATES PATENT OFFICE 1,950,887

INTERNAL COMBUSTION ENGINE

Thomas C. Van Degrift, Detroit, Mich., assignor to Packard Motor Car Company, Detroit, Mich., a corporation of Michigan Application July 16, 1930, Serial No. 468,275

9 Claims. (Cl. 74—38)

This invention relates to internal combustion engines and particularly to means for damping torsional vibration in the crank shafts of such engines.

It is one of the objects of the invention to provide effective means for damping torsional vibration in an engine crank shaft by fluid friction.

Another object of the invention is to provide a vibration damper for engine crank shafts in which the damping friction may be nicely regulated to secure a damping effect of any degree desired.

Another object of the invention is to provide hydraulic damping means for an engine crank shaft in which engine lubricating oil shall be used for the pressure fluid and in which oil expelled from the damping system may be made up with oil taken from the engine lubricating system, without the loss of oil from the engine system.

A further object of the invention is to provide damping means of the character designated in which mechanical friction shall be low and shall be between parts which are well lubricated so that the device shall be but little affected by wear.

Other objects of the invention will appear from the following description taken in connection with the drawing, which forms a part of this specification, and in which:

Fig. 1 is a view, partially in side elevation and partially in longitudinal vertical section through part of an internal combustion engine embodying the invention;

Fig. 2 is a view, partially in elevation and partially in transverse section substantially on the line 2—2 of Fig. 1, and Figs. 3 and 4 are sectional views taken substantially on the lines 3—3 and 4—4 respectively of Fig. 2.

Referring to the drawing, 10 represents a part of the crank case of an internal combustion engine, being one of a number of transverse webs therein. These webs support suitable aligned bearings 11 for an engine crank shaft 12, the latter having the usual integral cranks 13, each of which is connected by a connecting rod 14 with a piston mounted in one of the engine cylinders. The piston and cylinder are not shown in the drawing but are of usual construction.

In the embodiment of the invention shown, the crank shaft 12 is of that type in which the cranks 13 are formed in pairs between adjacent bearings 11, each pair having a common crank arm or cheek 16, but it is to be understood that the invention is not limited to shafts of this type, but may be applied to crank shafts having any of the well-known arrangements of cranks and bearings.

The forward end of the crank shaft 12 may be reduced in diameter and provided with a gear or sprocket 17 rotatably secured thereto as by a key 18, through which the engine cam shaft and other engine accessories may be driven by an intermeshing gear or a sprocket chain (not shown). The gear 17 may be conveniently retained in axial position by a nut 19 screwed to the reduced end 21 of the shaft, and provided with teeth 22, which may be engaged with teeth on a suitable starter shaft, such as the hand crank (not shown) used for manually rotating the engine for starting.

The damping means of this invention is illustrated as mounted near the forward end of the crank shaft 13, on a crank arm thereof. It is in the form of a weight or inertia member 23, preferably of bar-like shape, pivotally mounted on the crank arm 16 in the plane of rotation thereof. The supporting means for the inertia member 23 consists of a plate 24, bolted to the crank arm as indicated at 26, and having an integral arm 27 projecting normally thereto. A cross member 28 is secured to the end of arm 27 as by screws 29, and may constitute a part of the counterweight mass for the crank shaft 12. The arm 27 projects through a slot 31 in the inertia member and supports a transverse pin 32 which projects from each side thereof, on which the inertia member is pivotally mounted. As illustrated, and as preferred, suitable antifriction bearings 33 are provided between each end of the pin 32 and the inertia member 23 to reduce the pin friction as much as possible, these bearings being conveniently retained in position by plugs 34 screwed into counterbores in the sides of the inertia member.

The upper face of the inertia member 23 on each side of the pivotal axis provided by the pin 32, is provided with a depression 36, which forms a retaining means for one end of a coil spring 37, the other end of which is seated in a bore 38 formed in the cross member 28 opposite the depression 36. These springs 37 are of equal strength and are equally spaced from the pivotal axis, so that they exert equal and opposite moments tending to turn the inertia member, and thus urge it continually toward its neutral or mid-position with respect to the crank arm. They also serve to return it to that position after displacement therefrom.

These springs 37 are preferably of the helical form in which internal friction or hysteresis is not high. Moreover, there is but little friction in the pivotal bearings 33, so that no very considerable damping effect is provided by the mechanical friction resisting movement of these members.

The major portion of the damping effect is provided by hydraulic resistance elements which, in the present embodiment are in the form of fluid pressure chambers 41 in the inertia member 23 near the ends thereof. These chambers may conveniently take the form of cylinders 42, closed at the top, and screwed into or otherwise removably secured to the member 23. In these cylinders plungers 43 are reciprocably mounted. The lower portion of each of the plungers 43 is a good piston fit in its cylinder 42, and projects toward the plate 24, having a rounded end in contact therewith. The upper portion of each plunger is reduced in section, as indicated at 44, and is surrounded by a light coil spring 46 adapted to urge the plunger continually into contact with the plate 24.

It will be understood that the cylinders 42 are adapted to be filled with any suitable liquid, such as engine lubricating oil, and to this end a passage 47 communicates with each of said chambers and with a passage 48 in the pivot pin 32, which is supplied with oil under pressure from the engine lubricating system through a conduit 49. This conduit is connected through communicating passages drilled in the crank arms and the crank pins (not shown) with the engine oil pressure manifold 51 in the well-known manner. The passage 47 leads oil under pressure to a cross passage 52, best shown in Fig. 4, and thence through ports 53 to the chamber 41. In this way any oil which is lost past the plunger 43 during the period of oscillation of the inertia member is made up by oil taken from the engine lubricating system. At the same time any oil so expelled from the damper is caught in the engine crank case and retained in the engine system. A non-return valve 54, between the cross passage 52 and the ports 53, prevents a reverse flow of oil into the lubricating system when the cylinder 42 is under high pressure, so that the entire damping system is kept full of oil.

The cylinders 42 are also connected by a passage 56 and cross passages 57 which are conveniently formed by drilling in the inertia member 23. At any convenient portion between the ends of the inertia member, the passage 56 is provided with a suitable restriction which, as best shown in Fig. 3, is preferably adjustable to regulate the flow of oil and consequently the damping friction. This may take the form of a set screw 58 having a pointed end 59 adapted to intersect the passage 56 and reduce the section thereof as will be readily understood. In this manner, the transfer of fluid through the passage 56 from one cylinder 42 to the other, as the plungers 43 are oscillated in response to oscillatory motion of the inertia member, may be opposed by any desired amount of fluid friction, obtained by suitable adjustment of the set screw 58. The resistance to flow so introduced provides the desired damping effect, extracting energy from the vibratory system by reason of the fluid friction, and dissipating this in the form of heat at a rate sufficient to prevent resonant growth of the vibratory disturbance.

It will be understood from the foregoing description that this invention provides a simple and reliable hydraulic damper for engine shafts, in which the greater portion of the damping friction or resistance may be conveniently adjusted to meet the requirements of any particular installation, and in which the fluid damping means is kept automatically full but without loss of fluid from the engine system.

It will also be evident that the device provided by this invention is sturdy in construction and of long life, and that it is but little affected by wear of the moving parts.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. In a vibration damper for crank shafts having a crank arm, an inertia member pivotally mounted on said crank arm for oscillation with respect thereto and having a fluid chamber in each end thereof, plungers in the chambers adapted to bear on the crank arm to resist oscillatory movement thereof, yielding means associated with said plungers for maintaining engagement between the latter and said crank arm, yielding means acting between said crank arm and inertia member for resisting oscillation of the latter, a fluid conduit connecting said chambers, and means in said conduit to resist the flow of fluid therethrough.

2. In a vibration damper for crank shafts having a crank arm, an inertia member pivotally mounted on said crank arm for oscillation with respect thereto and having a fluid chamber in each end thereof, plungers in the chambers adapted to bear on the crank arm to resist oscillatory movement thereof, yielding means associated with said plunger for maintaining engagement between the latter and said crank arm, a restricted fluid conduit connecting said chambers, and springs acting between the crank arm and the inertia member urging said member to the neutral position after displacement therefrom.

3. In a vibration damper for crank shafts having a crank arm, an arm secured to said crank arm and normal thereto, a pivot pin carried by said normal arm, an inertia member mounted on said pin to oscillate in response to crank shaft vibration, opposed springs acting between the inertia member and the crank arm to urge said inertia member toward neutral position, and fluid pressure means carried by the inertia member on opposite sides of the pivot pin to oppose oscillation thereof.

4. In a vibration damper for crank shafts having a crank arm, an inertia member pivotally mounted on said arm to oscillate in response to shaft vibration, yielding means acting between the crank arm and the inertia member to urge the latter toward a neutral position, and opposed fluid pressure means between the inertia member and the crank arm acting independently of said yielding means to oppose oscillation of the inertia member.

5. In a vibration damper for crank shafts having a crank arm, an inertia member pivotally mounted on said arm to oscillate in response to shaft vibration, fluid pressure chambers carried by the inertia member, one on each side of the pivotal mounting, a conduit connecting said chambers, and plungers operatively disposed in said chambers and contacting the crank arm to oppose said oscillatory movement, and separate yielding means acting between said crank arm and said inertia member for resisting oscillatory movement of the latter.

6. In a vibration damper for a crank shaft having a counterweight rigidly secured thereto, an inertia member pivotally mounted on said counterweight, opposed spring means between the inertia member and the counterweight, and hydraulic resistance units between the inertia member and the crank shaft.

7. In a vibration damper for an engine crank shaft having a crank arm, a member secured to said crank arm and extending normally therefrom and having lateral projections in the plane of the crank arm, a pivot pin carried by the member, an inertia member mounted on said pin to oscillate in the plane of rotation of the crank arm between the arm and said projections, opposed springs between each projection and the inertia member, hydraulic cylinders carried by the inertia member, said cylinders being connected by a passage for fluid, and plungers in the cylinders adapted to resist oscillation of the inertia member.

8. In a vibration damper for the crank shaft of an engine having a pressure lubricating system, an inertia member pivotally mounted to oscillate with respect to the crank shaft, a fluid system comprising fluid pressure cylinders carried by the inertia member, a restricted passage connecting said cylinders, plungers in said cylinders each adapted to resist movement of the inertia member in one direction, means connecting said cylinders and passage to said pressure lubricating system, and yielding means separate from said fluid system and acting between said crank shaft and said inertia member to resist oscillation of the latter.

9. In a vibration damper for a crank shaft having a counterweight rigidly secured thereto, an inertia member pivotally mounted on said counterweight, springs between the inertia member and the counterweight adapted to urge the inertia member in opposite directions about its pivot, and hydraulic resistance units between the inertia member and the crank shaft, said units including resilient means acting between the inertia member and the crank shaft.

THOMAS C. VAN DEGRIFT.